United States Patent [19]

Stevens

[11] 3,926,559

[45] Dec. 16, 1975

[54] METHOD AND APPARATUS FOR QUANTITATIVE CHROMATOGRAPHIC ANALYSIS OF CATIONIC SPECIES

[75] Inventor: Timothy S. Stevens, Midland, Mich.

[73] Assignee: The Dow Chemical Company, Midland, Mich.

[22] Filed: Aug. 6, 1973

[21] Appl. No.: 386,262

[52] U.S. Cl............ 23/230 R; 23/253 R; 73/61.1 C; 210/25; 210/31 C; 210/38; 210/284; 210/294

[51] Int. Cl.² .................. G01N 27/08; G01N 31/04; G01N 31/08

[58] Field of Search......... 23/230 R, 253 R; 210/24, 210/25, 31 C, 37, 38, 284, 294, 28; 127/9, 46 A; 73/61.1 C

[56] References Cited
UNITED STATES PATENTS

| | | | |
|---|---|---|---|
| 2,422,054 | 6/1947 | Tiger...................................... | 210/25 |
| 2,617,766 | 11/1952 | Emmett ................................. | 210/25 |
| 2,871,147 | 1/1959 | Smith.................................... | 127/46 A |
| 2,950,176 | 8/1960 | Thayer................................ | 23/230 R |
| 3,382,034 | 5/1968 | Kraus................................... | 210/24 X |
| 3,537,821 | 11/1970 | Hrdina ............................... | 23/230 R |
| 3,676,106 | 7/1972 | Hazen ................................. | 210/24 X |
| 3,694,369 | 9/1972 | Orlandini........................... | 210/38 X |

OTHER PUBLICATIONS
O. Samuelson, "Ion Exchange Separations in Analytical Chemistry," 186–187, John Wiley, New York, 1963.

Primary Examiner—Morris O. Wolk
Assistant Examiner—Sidney Marantz
Attorney, Agent, or Firm—Edward E. Schilling

[57] ABSTRACT

Apparatus and method for chromatographic quantitative analysis of a plurality of species of cations in sample solution. A sample of the solution is added to a first ion exchange resin bed charged with a cation exchange resin and the sample eluted therefrom with a solution of mixed developing reagent consisting of either soluble silver salts or soluble barium salts and compatible, i.e., non-precipitating acid, the cations being chromatographically separated upon such elution. The effluent from the first ion exchange resin bed is passed through a second ion exchange resin bed charged with an anion exchange resin in an appropriate form to precipitate the silver salt or barium salt used in the developing reagent. As elution continues the sample passes from the second ion exchange resin bed to a third ion exchange resin bed charged with an anion exchange resin in the hydroxide form. Precipitation of developing reagents in the second bed and neutralization of acid in the third bed are carried out without interfering with the ionic separations achieved in the first bed. Each separated cationic species is quantitatively sensed by a detector such as a conductivity cell on exiting from the third ion exchange resin bed.

16 Claims, 1 Drawing Figure

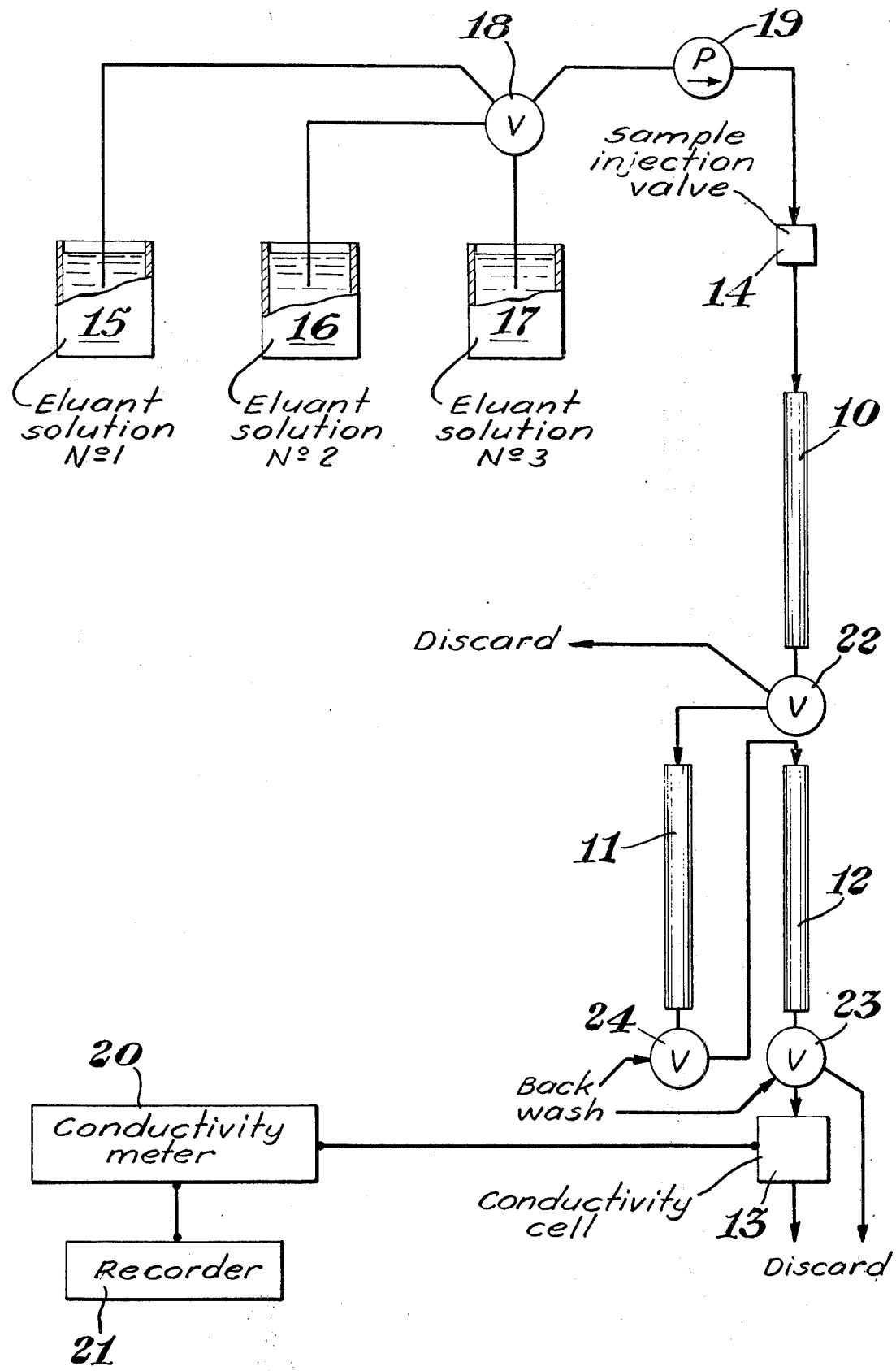

METHOD AND APPARATUS FOR QUANTITATIVE CHROMATOGRAPHIC ANALYSIS OF CATIONIC SPECIES

CROSS REFERENCE TO RELATED APPLICATIONS

In a copending application of Hamish Small and William C. Bauman, Ser. No. 386,260 filed even date herewith, there is described a method for quantitative analysis by chromatography of ionic species in solution wherein the solution is passed first through a separator ion exchange resin bed means and then through a stripper ion exchange resin bed means and thence through a detector such as a conductivity cell and associated readout means. Chromatographic separation is carried out in the separator bed and in the stripper bed the developing reagent used in the eluant solution is acted upon by an ion exchange resin so that the developing reagent in highly ionized form does not reach the detector along with the separated ionic species being analyzed. For example, the developing reagent is converted to a weakly dissociated molecule or is captured on ion exchange sites.

In a copending application of Hamish Small and Timothy S. Stevens, Ser. No. 386,263, filed even date herewith, there is disclosed the determination of the total ionic content of an aqueous sample solution on utilizing an ion exchange method in which the sample solution is added to a cation exchange resin in easily elutable cation form and the easily elutable cations displaced are eluted from the column with water, the effluent being passed to anion exchange resin which is in easily elutable anionic form, usually the hydroxide form. In the latter column all the anionic species in the sample are exchanged for a single anion. The effluent from the second resin bed, consisting entirely of a single ion pair species, viz., the preselected cation and the preselected anion, in water solution, is passed through a conductivity cell. Readout means associated with the conductivity cell indicate the number of equivalents of the single ion pair species corresponding to the number of equivalents of ionically dissociated compounds in the predetermined volume of sample solution.

In another copending application of Timothy S. Stevens and Hamish Small, Ser. No. 386,261, filed even date herewith, there is described a chromatographic method and apparatus for separating and quantitatively detecting more tightly bound cations such as the alkaline earth metal ions. The sample is placed on a cation exchange resin and eluted with a solution of either silver nitrate or barium chloride to achieve ion separation, after which the effluent from the cation exchange resin is passed through a stripper anion exchange resin bed means charged with an anion exchange resin in either the chloride or the sulfate form to precipitate the silver or barium ions from the eluant and the effluent passed through a detector such as a conductivity cell.

In another copending application of Hamish Small and Timothy S. Stevens, Ser. No. 386,264, filed even date herewith, there is described apparatus and method for chromatographically separating and detecting carboxylic acids or carboxylates using a cation exchange resin and water as eluant and a conductivity cell as common detector, with or without need for prior separation of inorganic halides on a silver ion form column.

In an additional copending application of Timothy S. Stevens and Hamish Small, Ser. No. 386,265, filed even date herewith, there is described apparatus and method for rapidly and accurately quantitatively measuring the quantity of a given ion in aqueous solution in the presence of a plurality of countervalent ions, using ion exchange techniques and a conductivity cell as detector.

BACKGROUND OF THE INVENTION

1. Field of the Invention

The invention relates to apparatus and method for chromatographic quantitative analysis of a mixture of cationic species of ionized materials in solution utilizing three ion exchange beds sequentially to resolve the cations to be analyzed and then to remove in part and alter the balance of the mixed developing reagent of the eluant whereby the resolved ion species can be sequentially detected and quantitatively analyzed utilizing a single common detector.

2. Description of the Prior Art

There is a constant and ever increasing demand for analysis of ionic or ionizable species in aqueous solution or other highly polar medium, particularly for inorganic species. This demand has become more prominent of late with the emphasis on water monitoring in connection with pollution control. Chromatographic methods of analysis have a particular appeal, especially from the point of view of automated monitoring, but no chromatographic technique has been developed heretofore for inorganic species that enjoys the same widespread use as does vapor phase chromatography for organic species. Moreover, this situation has prevailed despite the well-known ability of ion exchange resins to separate ionic species whether they be cationic or anionic in nature. The probable reason for this appears to be as follows. At least two very necessary prerequisites determine the utility of a chromatographic method: (1) separation of the ionic species by some means in the chromatographic column so that they appear at different times in the effluent, i.e., the species are resolved; (2) a convenient means of cntinuously and accurately analyzing for the species in the effluent, the means being universally applicable for every species contemplated.

The first prerequisite is quite well satisfied by the known ion exchange resins. For instance, it is a simple matter to obtain excellent separations of complex mixtures of cations or anions merely by eluting them through an ion exchange bed with an appropriate electrolyte serving as eluant or developing reagent.

The problem, however, is the inability, except in quite special cases, to satisfy the second prerequisite. As a rule, it simply is not possible to distinguish the ions eluting from the column from the more concentrated background consisting of developing reagent used to develop the chromatogram. In some instances it has been possible to use spectrophotometric detectors to distinguish a wide variety of ions, mainly organic ions. However, in the case of many ions, particularly the inorganic ions such as the ions of lithium, sodium, potassium, calcium, chlorine, bromine, iodine, and, the ammonium nitrate, nitrite, sulfate and phosphate ions, spectrophotometric methods have not been widely employed.

The use of two ion exchange resin beds in series for the demineralization of water is well-known. Typically, the first bed removes cations and the second bed removes anions to achieve a grade of water sometimes approaching the quality of distilled water as to mineral content and conductivity. In such demineralization operations, the mineral ions, both cations and the paired anions, are captured and held until the respective resin beds are loaded enough so that a substantial proportion of ions "break through" the ion exchange beds whereupon they are detected by a conductivity meter or by a "hardness" test. At this stage operations are either stopped or switched to an alternate set of beds and both ion exchange resin beds are subjected to respective separate backwashing and regeneration procedures wherein the cation exchange resin bed is soaked in strong mineral acid while the anion exchange resin bed is soaked in strong base, and each thoroughly rinsed with tap water whereupon the demineralizing equipment is ready for further service. During the demineralizing operations there is no elution with an eluant, or developing reagent, there is no development of a chromatographic separation, and no analysis, much less quantitative analysis of separated ionic species.

SUMMARY OF THE INVENTION

It has now been discovered that chromatographic quantitative analysis of a plurality of cationic species in sample solution is readily and expeditiously carried out upon adding a predetermined amount of the sample solution to a cation exchange resin bed means, the resin bed means being charged with a cation exchange resin, and chromatographically separating the plurality of species of cations on elution of the cation species from the resin bed means with a solution of a mixture of developing reagents, the mixture being selected from the group consisting of (1) soluble silver salt and highly dissociated acid, the anion of said acid not forming an aqueous-insoluble ion pair with silver ion and neither the anion of said silver salt nor the anion of said acid forming an aqueous-insoluble ion pair with any of the cation species at the concentration thereof in said sample solution, said mixture providing $Ag^+$ and $H^+$ and (2) soluble barium salt and highly dissociated acid, the anion of said acid not forming an aqueous-insoluble ion pair with barium ion and neither the anion of said barium salt nor the anion of said acid forming an aqueous-insoluble ion pair with any of the cation species at the concentration thereof in said sample solution, said mixture providing $Ba^{++}$ and $H^+$, the cation exchange resin and the mixture of developing reagent being preselected to cooperatively facilitate chromatographic separation of said cation species; passing the effluent from the cation exchange resin bed means through a first anion exchange resin bed means, the first anion exchange resin bed means containing an anion exchange resin in a form capable of precipitating whichever metal ion is used in the developing reagent solution, the form being selected from the group consisting of chloride to precipitate $Ag^+$ and sulfate to precipitate $Ba^{++}$, the exchange capacity of the anion exchange resin being at least sufficient to substantially precipitate all of the metal ion, as well as exchange, for chloride or sulfate, the anion of the developing reagent, if different, contained in the developing reagent solution, the nature of the first anion exchange resin and the configuration of the bed thereof being preselected to not destroy the said chromatographic separation; passing the effluent from the first anion exchange resin bed means through a second anion exchange resin bed means containing an anion exchange resin the the hydroxide form, the exchange capacity of the resin in said second bed being at least sufficient to neutralize all of the hydrogen ion in the effluent from the first anion exchange resin bed and derived from the developing reagent used in the chromatographic separation in the cation exchange resin bed means, the nature of the second anion exchange resin and the configuration of the bed thereof being preselected to not destroy the said chromatographic separation, thereby in said two anion exchange resin bed means effectively converting all of said mixture of developing reagent to weakly ionized form; and quantitatively detecting each separated cation species exiting from said second anion exchange resin bed means. The method is of particular advantage in the separation of more tightly bound cations from a mixture including other species of similarly bound ions such as (1) a mixture of alkaline earth metal ions; (2) a mixture of protonated amines; (3) a mixture of quaternary ammonium compounds; (4) any mixture of ions of the types recited, or (5) a mixture of the cations $Na^+$, $Ca^{++}$ and $Mg^{++}$, normally found together in surface waters.

To avoid precipitation of alkaline earth metal ions in hydroxide form in the second stripper column, the concentration of such metal ions must be kept low enough according to the respective solubility product constants. The maximum ion concentrations for any given resin and sample type are determined by running a series of standards.

The present apparatus includes three chromatographic columns and a conductivity cell connected in series by liquid conduit means, means for adding liquid sample solution and solution of developing reagent to the first column and readout means associated with the conductivity cell.

In preparing the apparatus for use, the first chromatographic column is charged with a cation exchange resin which preferably is a high-performance, low-capacity resin such as surface sulfonated copolymer of styrene and divinylbenzene containing about 2 to 4 percent by weight divinylbenzene; the second chromatographic column is charged with an anion exchange resin in the chloride form if a silver ion-containing developing reagent is being used or in the sulfate form if a barium ion-containing developing reagent is being used; and the third chromatographic column is charged with an anion exchange resin in the hydroxide form. The total exchange capacity of each of the anion exchange resin beds must be sufficient to accommodate all of the developing reagent utilized to being about chromatographic separation and elution of the cations of interest off the cationic resin bed. By accommodation is meant in the case of the first anion exchange resin bed precipitation of substantially all of the metal ions of the developing reagent and conversion of substantially all of the anions of the developing reagent to the anion form of the resin bed and in the case of the second anion exchange resin bed, the exchange of all of the incoming anions for the hydroxide ions with which the second bed is charged, thereby neutralizing the hydronium, or hydrogen, ions in the solution entering the second bed.

BRIEF DESCRIPTION OF THE DRAWING

The single FIGURE of the drawing is a schematic representation of an embodiment of the apparatus of the invention showing in series a plurality of reservoirs of eluant solution, a pump, a special injection valve, or other sample injection device, a first column for the resolution or separation of the cationic species, and two stripper columns used in series to remove developing reagent, and followed by a conductivity cell having associated readout means.

FURTHER DESCRIPTION OF THE INVENTION

The present method and apparatus are well adapted for the rapid and automated analysis of a great variety of cationic species but is of particular advantage in analyzing and separating groups of cations that are more tightly bound or held to the ion exchange resin than are, for example, the alkali metal cations. The cations of the alkaline earth metals, for example, as a group are relatively tightly held by cation exchange resins and elution with a developing reagent such as hydrochloric acid is relatively slow, and the concentration peaks are relatively shallow and smeared out, reducing sensivity. Similarly, the cations of the organic amines and the quaternary ammonia compounds are more tightly held by cation exchange resins and exhibit a behavoir similar to the alkaline earth metal cations in being difficult to move off the column in practical time periods. This problem has been solved according to the present invention by utilizing a solution of developing reagent that is more effective in competing for the ion exchange sites and thus moving the cations of interest off the column in a shorter period of time and that also facilitates obtention of sharply defined concentration peaks providing greater sensitivity of detection. To assure the presence of the amines in protonated form thus making them amenable to chromatographic separation on an ion exchange resin, the solution of developing reagent includes a sufficient concentration of hydronium ions to assure protonation. The method is effective for the separation of any of the alkaline earth metal cations from a group of the same. It is of particular advantage in making possible the separation of amines which are not in ionic form unless protonated. The method is effective for separating, from a mixture thereof, any of the primary, secondary or tertiary non-aromatic organic amines whose acid addition salts are soluble in aqueous medium or other polar solvent medium selected for carrying out the present method. The aromatic amines whose acid addition salts are soluble in water or other selected solvent medium may also be separated and quantified by the present method, although other analytical methods and techniques of detection, such as ultra-violet spectrometry, are generally to be preferred for these aromatic compounds. While analysis is ordinarily carried out in aqueous medium, the procedure may also be carried out in non-aqueous solvents providing the solvents are highly polar. Examples of suitable non-aqueous media include the lower alcohols having from 1 to 4 carbon atoms.

Referring now to the single FIGURE of the drawings, the apparatus of the present invention is seen basically to consist of a first chromatographic column 10 arranged in series with second and third chromatographic columns 11 and 12, followed by a conductivity cell 13. Sample may be placed on or added to the column 10 in most any suitable manner as by a gravity flow system but preferably by means of a syringe (not shown) is added to the system at sample injection valve 14. Sample injection valve 14 is of a type now commonly used for chromatographic analyses and typically is provided with one or more bores in the valve core of different sample volume or void space plus a plurality of ports or connections to the valve body providing for a sample holding loop of liquid conduit means. In any event, the sample holding volume or void space is filled by a syringe or other convenient means after which the valve is manipulated to bring the sample holding volume into series with the stream of solution of mixed developing reagents constantly passing through a portion of the valve body and the selected sample portion is thereby swept on successively into the respective chromatographic columns.

In the present apparatus the sample injected at injection valve 14 is swept through the apparatus by solution of developing reagent, i.e., eluant solution drawn from any of the alternative reservoirs 15, 16 or 17 as determined by selector valve 18 and is drawn by pump 19 and passed through the sample injection valve 14 to the first chromatographic column 10. As indicated above, the solution of mixed developing reagents may be added to the first column manually as by pouring the solution from a vessel into an open column, but is preferably added in a continuous stream to obtain better uniformity and usability in results and under pressure to achieve fast flow rates and rapid results. The solution leaving chromatographic column 10 with the cationic species resolved is conveyed by a liquid conduit to the chromatographic column 11, that is, the second chromatographic column, wherein the metal ion in the solution of mixed developing reagents is precipitated and the anions of the solution of mixed developing reagents are substantially all exchanged for the anions of the form of the anion exchange resin in the column 11. The solution with resolved species therein and now substantially stripped of metal ion of the mixed developing reagents, then exits from the second chromatographic column 11 through liquid conduit means to the third chromatographic column 12. The third chromatographic column 12 is charged with an anionic exchange resin in the hydroxide form and the anions entering the solution as a result of the exchange in the preceding anionic exchange column 11 are substantially all exchanged for hydroxide ions, thereby effectively neutralizing all of the hydronium ion entering the chromatographic column 12 from the chromatographic column 11.

Thus, the chromatographic columns 11 and 12 serve to effectively prevent the mixture of developing reagents employed from exiting from these columns in highly dissociated form detectable by a conductivity cell. The effluent from the third chromatographic column 12 is conveyed by liquid conduit means to a universal or common detector, such as conductivity cell 13 wherein the resolved cationic species under determination are quantitatively detected. The electrical signal passing through the conductivity cell 13 is measured by the conductivity meter 20 and the output of the meter is directed to the recorder 21 or other suitable readout indicator.

The cation exchange resin employed in the first chromatographic column 10 ordinarily does not require back-washing or regeneration since the resin is constantly being swept by the acidic solution of mixed developing reagent. However, the anion exchange resins in each of columns 11 and 12 require, periodically, (1) replacement or (2) backwashing and regeneration to remove precipitated developing reagent as in the case of column 11, to place the anion exchange resins in the proper anionic form. While it is not absolutely essential, it is convenient to provide valving means between the chromatographic column 10 and the chromatographic column 11 to provide for the diversion and discard of regeneration and backwash liquid being passed through the column 11. Likewise, it is convenient to provide a multi-port valve or equivalent valving such as valve 23, following column 12, which provides for direction of effluent from the chromatographic column 12 to the conductivity cell 13 as well as for introduction of backwash and regeneration liquids and further allows for the bypassing of the conductivity cell 13 at any time that operation of the conductivity cell is not required. The exhausted sulfate form anion exchange resin used with $Ba^{++}/H^+$ reagent must be replaced as it can not be regenerated.

It must be understood that the columns shown in the drawing are ordinarily small diameter tubing, usually of glass or stainless steel, the small diameter, together with fast flow rates of solution of developing reagent facilitating analysis times of generally less than about 20 to 30 minutes for a plurality of ionic species, though much longer times are sometimes needed. For the purposes of the present discussion and the appended claims, small diameter columns are those having an internal diameter (I.D.) of not more than about 2 to 10 millimeters. Larger diameter columns may be used if desired, such as columns having an I.D. of 25 or 50 millimeters. It is generally preferred for the practice of the present invention in routine analytical work, that the size of the columns employed is not more than about 2 to 10 millimeters I.D.

In carrying out the present method, the total exchange capacity of the cation exchange resin bed employed is preferably very small and the performance of the resin is desirably very high in order to facilitate rapid, sharp separations of the cations being determined. In addition, the sample size is preferably also quite small in order to avoid overloading the cation exchange resin in the first column. As a consequence of both these items it is not necessary to employ large volumes of solution of mixture developing reagents for the chromatographic separation in the first, i.e., separator, resin bed.

The cation exchange resin used in this first bed, as indicated, is preferably a high-performance low-capacity ion exchange resin. Such a resin, e.g., is surface sulfonated copolymer of styrene and divinylbenzene containing about 2 to 4 percent by weight of divinylbenzene or other similar performing pellicular ion exchange resin. The ion exchange capacity required in the second bed is by appropriate menas, then, kept in manageable portions. A syringe is conveniently used to inject each respective portion of the sample solutions into a sample injection valve which measures out, e.g., from about 0.002 to about 5 milliliters of a dilute solution containing a plurality of the cationic species to be measured, which in total are present in an amount, expressed in milliequivalents not greater than about 1 to 10 percent of the ion exchange capacity of the separator bed, thus providing for good resolution on such column without overloading.

The use of a syringe and sample injection valve with a choice of interchangeable measuring loops of various sizes corresponds to conventional practice for introducing a measured volume of sample to a chromatographic column. Other means of sample introduction may be employed, if desired, including direct injection into the eluant stream using a syringe or by putting a measured sample portion into the top of an open column. However, gravity flow operations tend to be less easily controlled.

It is therefore much preferred to use a pump and to supply a substantially continuous stream of solution of mixed developing reagents, according to good current chromatographic practice in which the solution of developing reagents is used to sweep the sample out of the sampling valve and on to the first column. Typical flow rates fall, generally, in the range of about 20 to 1000 milliliters per hour of solution of developing reagents when the columns used are about 2 to 10 millimeters I.D.

The ion exchange resin to be used in the separator column, i.e., the column corresponding to column 11 of the drawing, is selected with a view to the kinds of cations to be separated and the developing reagent to be used therewith to achieve good separation. While any given separation may be achieved, usually, with any of several different resins, the generally used, relatively high specific exchange capacity resins commercially available similar to Dowex 50W type ion exchange resin each reqire the use of a quantity of solution of developing reagent sufficient to rather rapidly exhaust the types of resin usable herein in the stripper beds, i.e., the second and third beds. Thus, it is much preferred as a practical matter and especially for the purposes of regular repetitive analyses, that the first, i.e., the separator, resin bed be of a cation exchange resin with special characteristics. This special resin is one with high performance characteristics in its ability to separate cationic species, but at the same time is a resin of low specific capacity so that only a small amount of developing reagent is needed to accomplish separation and elution off the resin bed. For the present purposes, it is preferred that the specific exchange capacity of the separator resin is in the range of about 0.005 to 0.1 milliequivalents per gram (meq/g) of resin.

The term high performance, as used herein, means that the ionic species are cleanly and sharply separated so that the readout means shows sharp concentration peaks and good baseline separation between all or most of the peaks. This implies that the ionic species do not penetrate deeply into the resin structure nor are the ionic species otherwise held up during development of the chromatographic separation, else the peaks would not be sharp and well separated.

For high performance characteristics, it is essential that highly active ion exchange sites are disposed on and in a surface layer of the resin beads or particles, i.., that the resin be pellicular in nature, and that such sites be readily and promptly available to ionic species in solution flowing over the resin bead surfaces. In a cross-linked gel form ion exchange resin, the exchange process will not be as prompt and efficient as desired. Therefore, the preferred separator resin is pellicular in nature in having the active sites at or very close to the surfaces of the resin beads. Somewhat less preferred but superior to the gel form resins are the cross-linked ion exchange resins or other porous ion exchange media such as modified porous silica which are porous in nature having active sites along the walls of the pores but the pores providing far more accessibility to the ionic species than is found in the gel type resins. The high performance resins facilitate obtention of the sharpest peaks and best resolution of the ionic species although the other resins may be of advantage in a situation where two ionic species tend to elute simultaneously from the high performance resin.

THe preferred ion exchange resin for separation of cations according to the present invention is a surface sulfonated copolymer of stryene and divinylbenzene having about 2 to 4 percent by weight divinylbenzene in the copolymer and the balance substantially styrene. The beads are preferably of an average particle size in the range of about 200 to about 400 mesh (U.S. Sieve Series) although finer sizes may be used if desired. In general, a coarser grade permits faster flow rates at a given applied pressure from the pump while finer grades afford greater exchange capacity per gram for a given degree of sulfonation. Surface sulfonation is accomplished rather simply by briefly heating the copolymer beads in hot, e.g., 80° to 110° C. concentrated sulfuric acid for a short time, for example, about 15 minutes, or until the desired specific exchange capacity is achieved but not exceeded. A specific exchange capacity of about 0.02 meq/g of resin is sufficient to achieve good separations and is low enough to afford the use of a reasonable volume of regular resin in the stripper beds. In contrast, a conventional cation exchange resin such as Dowex 50 W type ion exchange resin not lightly sulfonated as above, has a specific exchange capacity of about 0.5 to 3 meq/g of water swollen resin.

The ion exchange resin used in each of the stripper columns is preferably a high capacity resin so that the resin can handle relatively large volumes of solution of developing reagent, for example, the solution from a plurality or multiplicity of samples without allowing the developing reagent to reach the conductivity cell in highly ionized form. Any of the commercially available high capacity anion exchange resins such as Dowex 1 × 8 resin are usable in the stripper columns. In the first stripper column, that is the second chromatographic column 11 in the drawing, the anion exchange resin employed is in an appropriate form for precipitation of the metal ion being used in the mixed developing reagent solution. When using a mixture of soluble silver salt and a source of hydrogen ions as mixed developing reagent, the first stripper resin is in the chloride form. When using a soluble barium salt and a source of hydrogen ions as mixed developing reagent the first stripper resin is in the sulfate form.

The anion exchange resin in the second stripper column, i.e., the third chromatographic column 12 in the drawing, is in the hydroxide form which provides for neutralization of the hydronium ion derived from the developing reagent.

The bed volume and geometry of each of the stripper resin beds should be selected with care to avoid problems in smearing out or disturbing, in the stripper beds, the separation obtained in the separtor bed. Generally, the volume of the stripper beds collectively are minimized and the cross section area held, if possible, reasonably close to that of the separator bed. Preferably, therefore, the diameter of each stripper column does not vary widely from the diameter of the separator column. However, this may be varied to accommodate various needs. Thus, the separator bed may be larger than the stripper beds in total if necessary to achieve separation of difficultly resolvable ion combinations. On the other hand, if resolution is easily achieved, repetitive analyses may be carried out more rapidly if the separator bed is relatively small, typically, as to its depth.

The relationships shown according to the following equation are used to select the resins and estimate the amounts thereof to achieve predetermined results:

$$V_B = \frac{V_A C_A K_{E^+}{}^{M^+} N}{C_B} + X \frac{[H^+]}{[Ag^+]}$$

where $$X = \frac{V_A C_A K_{E^+}{}^{M^+} N}{C_B}$$

$$V_C = X \frac{[H^+]}{[Ag^+]}$$

$V_B$ = volume in milliliters of the first stripper bed.
$V_C$ = volume in milliliters of the second stripper bed.
$V_A$ = volume in milliliters of the separator bed.
$C_A$ = specific exchange capacity in meq/ml of the separator resin.
$C_B$ = specific exchange capacity in meq/ml of the 1st stripper resin.
$C_C$ = specific exchange capacity in meq/ml of the 2nd stripper resin.
$K_{E^+}{}^{M^+}$ = selectivity coefficient, relative to eluant ion $E^+$ of the sample cation $M^+$, which in the series to be analyzed has the greatest affinity for the separating resin. In this case $K_{Ag^+}{}^{M^+} >> K_{H^+}{}^{M^+}$ and in effect only $Ag^+$ is considered an eluant in this regard. The same is true using $Ba^+/H^+$ mixed eluant.
$[H^+]/[Ag^+]$ = concentration ratio in the mixed eluant.
$N$ = approximate number of samples that can be analyzed before exhausting the stripper bed.

As will be apparent, the optimum amount of stripper resin needed is not the same in each column. The anion exchange resin in the hydroxide form used in the second of the stripper columns is generally usable in a smaller amount.

To obtain a high chromatographic efficiency it is necessary to keep $V_B/V_A$ and $V_C/V_A$ as low as possible. A value close to unity is excellent, but a value of less than about 10 is acceptable. In order than N be as large as reasonably possible, i.e., that a large number of samples may be processed before the stripper resin is exhausted, it is necessary that the quantity $C_A K_{E^+}{}^{M^+}/C_B$ be kept, in certain limits, as small as possible wherein K is the selectivity coefficient for the most tightly bound cation being determined. This can be done by:

1. Maintaining $C_B$ and $C_C$ as large as possible by using conventional anion exchange resins of a high degree of cross-linking.

2. Maintaining $C_A$ as small as possible. This is best achieved by using specially prepared resins of very low specific capacity. However, a lower limit on the capacity of the separating resin is set by the need to avoid overloading of the column by the sample injected, keeping in mind that the sample must be large enough for the ionic species of interest to be detectable. Generally, at least 25 to 35 nanograms of a given cation species is required for quantitative detection by a conductivity cell, the response varying with the nature of the ionic species, requiring calibration for each conductivity cell and readout combination. In some instances, as little as three nanograms of an ionic species have been quantitatively detected.

The anion exchange resins usable in the stripper columns, i.e., the second and third beds, are typically polystyrene or modified polystyrene copolymers cross-linked, e.g., with divinylbenzene and carrying nuclear groups, the latter providing the active exchange sites. The strong base anion exchange resins carry nuclear chloromethyl groups which have been quaternized. The weak base exchange resins carry nuclear primary, secondary or tertiary amine groups. Other anion exchange resins are the polyalkylene polyamine condensates.

For further information on ion exchange theory, processes and resin synthesis references made to the monograph: "Dowex: Ion Exchange" 3rd Ed., 1964, published by The Dow Chemical Company, Midland, Michigan, and the two volume work "Ion Exchange" edited by Jacob A. Marinsky and published by Marcel Dekker Inc., New York, 1966. Chapter 6, Vol. 2 of "Ion Exchange" is devoted to a description of synthesis of Ion Exchange resins of various types usable herein in the stripper resin beds.

It is to be understood that the cation exchange resin used in the separator bed according to the invention is not used to collect ionic species, but to develop a chromatographic separation of the cations on elution, and thus the separator bed resin after development of the chromatographic separation and elution of the cations off the bed does not require regeneration before the next analysis is conducted. On the other hand, the anion exchange resin in each of the stripper columns do effect true ion exchange and must be used in a predetermined form, e.g., chloride or sulfate form for the first column and hydroxide form for the second column in order to collect the ionic portions of the mixed developing reagents which would otherwise pass on to the detector in highly ionized form.

It is also to be understood that the references herein to the use of a given resin bed or column is meant to include the use of the requisite amount of ion exchange resin for the purpose specified whether utilized as a single bed or separated into fractional amounts and placed in a plurality of beds or columns. Thus, reference to a first stripper bed means is meant to refer to the requisite amount of anion exchange resin in the chloride or the sulfate form regardless of whether the resin is disposed in one, two or more chromatographic columns. In general, there is no reason to separate the ion exchange resin, for a given function herein, into multiple beds, and the aapparatus of the invention ordinarily consists of the three specified columns, viz., a separator column followed by two stripper columns, each with a specific function.

The cation species reaching the detector in detectable ionic form do not elicit equally great responses per equivalent weight of ion, i.e., the conductance of 0.01 molar n-butylamine solution is not the same as the conductance of 0.01 molar di-n-butylamine solution. Therefore, the instrumental response of the present instrument must be calibrated using known concentrations of known substances in order to carry out accurate quantitative analyses.

The detector used may be a polarographic cell, a differential refractometer, a specific ion electrode or a spectrophotometer since each of these is capable of use as a common detector, i.e., a detector capable of detecting and quantifying each ionic species of interest in a given determination, rather than having to resort to various analytical instruments or detectors during the course of each determination. The preferred detector is the conductivity cell because of its high sensitivity and universal ability to detect ions in solution.

In carrying out analysis of a plurality of cation species according to the present method, a solution of the ionic species is filtered, if particulate material is present, the pH is adjusted if necessary to insure solubility, or, if desired, to protonate the compounds of interest, e.g., in the case of organic amines, and the sample is diluted or concentrated in order to obtain a suitable working, detectable quantity of ionic species in a reasonable volume for injection into the present apparatus. In the case of the organic amine samples, initial preparation usually includes simple hydrohalide salt preparation as by acidification in an aqueous medium in order to achieve solubility, though it is not necessary to protonate the amines in the sample solution for the purposes of analysis as the acid used in the mixed developing reagents is provided to assure protonation. The total amount of ionic species of all kinds in the sample and a manageable amount of solution for injection onto the first column should be, as expressed in a number of equivalents, in the range of not more than about 1 to 10 percent of the ion exchange capacity of the first ion exchange resin bed, and may be less if sensitivity of the detector permits.

In the present commercially available sample injection valves, a given valve plug bore or a loop of tubing connected to two of the valve body parts determine the sample size which is swept out by the solution of developing reagent as well understood in the art. Manageable amounts of solution handled by such valves vary from about 0.002 to about 5 milliliters. The sample in the injection valve is swept out, preferably by a steady stream of eluant, to the first ion exchange resin bed where chromatographic separation of the various cationic species takes place as elution continues.

The solution of developing reagent selected must be capable of moving the most tightly bound species present, and of interest, off the separator resin bed. To that end it is preferred that the developing reagent has an affinity for the ion exchange resin in the first resin bed in the range of about 0.1 to 10 times the affinity of the most tightly bound ion to be moved off the column.

The metal ion in the mixed developing reagent solution is provided by a silver salt or a barium ion having the requisite solubility to provide the desired metal ion concentration and having an anion that is compatible with the sample to be analyzed. Highly soluble silver salts are rather limited in number. The acetate, metaborate, bromate, chlorate, fluoride, perchlorate, sulfate and tartrate salts exhibit sufficient solubility and are usable, wherein the anions thereof do not precipitate the cations of the sample. Since most of these materials will precipitate alkaline earth metal ions and it is usually preferred to have a solution of developing reagent that will work with a variety of samples, the clear practical choice of silver salt is silver nitrate.

Similarly, various soluble barium salts of aliphatic organic acids or inorganic acids such as the acetate, formate, butyrate, succinate, bromide, bromate, iodide, perchlorate, thiosulfate and chlorate salts may be used, if desired, barium chloride or barium nitrate will generally be selected as least expensive, most readily availabe, and least likely to be incompatible with sample cations.

In the case of the amine analysis it is necessary that the developing reagent contain sufficient hydrogen, i.e., hydronium, ion to assure conversion to and of the amines in the protonated form during traversal of the separator column and of the first stripper column.

The hydrogen ions for the mixed developing reagent may be provided by most any acid, the anion of which does not precipitate any of the silver ion, or barium ion, reagent, as the case may be, nor any of the cation species being determined, at least at the concentration provided by the sample solution. In addition, the acid must be sufficiently dissociated to be able to maintain the amines present in substantially completely protonated form. AS a practical matter, it is usually most convenient and the results most certain when the acid employed is a highly dissociated mineral acid, the anion of which does not precipitate the silver ion or the barium ion, whichever is used in the mixed reagent. Thus, nitric acid is selected for use with silver ion, and either nitric acid or hydrochloric acid is used with barium ion. Hydrobromic acid may also be used with barium ion but is more expensive.

An acid concentration of about 0.0001 moles/liter appears to be about the lowest concentration which will assure protonation of most amines although acid concentrations up to about 0.05 molar may be used without exhausting the second stripper bed at an undue rate.

Wherein silver nitrate is employed, the concentration used ranges from about 0.0001 to about 0.05 moles/liter. Generally the silver nitrate concentration at the lower concentration levels is effective for the elution and separation of lower molecular weight amines. However, if the silver nitrate concentration is too low, traces of chloride, bromide or iodide in the original sample solution, if present, will precipitate too much of the silver ion and seriously interfere with the chromatographic separation process. In a separation of alkaline earth metal ions, it is preferred that the silver ion concentration be 0.001 molar, or higher up to the point separation of the ions is not obtained. That is, upon increasing the concentration of silver ion, the alkaline earth metal ions elute more quickly and at higher silver ion concentrations, above aabout 0.1 M, may elute substantially simultaneously. This is to be avoided and when the simultaneous elution is observed, the analysis is repeated with a more dilute solution of silver ion being employed until separation is obtained. Wherein a barium salt is used in the developing reagent, the barium ion can be used at a slightly more dilute level than the silver ion since barium ion is a more effective developing reagent. Generally, the concentration of barium ion must be at least 0.0001 molar in order to avoid traces of sulfate ion in the original sample precipitating too much of the barium ion. In general, it is found in practice that the molar ratios of silver salt or barium salt to the mineral acid used therewith is preferably in the range of about 1:1 to 50:1 but more preferably is in the range of about 5:1 to 10:1.

The term mixed developing reagents intended to means the substances rather than the solution per se, which move the ion species to be determined through and off the separator resin bed. It is thus apparent that the developing reagents must have a fair degree of affinity for the ion exchange sites on the separator resin in order to displace the ionic species to be determined. The key developing reagent in the practice of the present invention is the metal ion, though the solution contains sufficient hydronium or hydrogen ion to assure protonation of amines, if any, in the sample solution.

The solution of developing reagents is sometimes referred to herein as eluant solution. In general, the more dilute solutions used and the greater provisions for more complete resolution of the cation species, the longer are the times required to complete analysis of a given sample since, basically, about the same number of equivalents of metal ions in the developing reagent are going to be used for a given analysis on a given instrument. On the other hand, the use of more concentrated solutions and higher flow rates and smaller bed volumes, where these may be used effectively, or tolerated, permit completion of analysis in a shorter time span. These factors will be balanced to achieve practicality of time permitted and accuracy and precision of results required.

Extremely tightly bound ionic species not being determined occasionally find their way onto the separator resin. These can be removed, if found to be affecting the capacity of the separator bed, by flushing the same with a developing reagent capable of displacing such ionic species, such as an eluant similar to one used for analysis but at a much higher concentration.

The first stripper column containing an anion exchange resin in the chloride form wherein silver ion is used as the developing reagent component which effectively moves tightly bound cations off of the separator resin becomes exhausted when substantially all of the chloride has reacted with incoming silver ion and precipitated as silver chloride. The exhausted column is usually regenerated by passing an ammonia-ammonium-chloride solution through the resin in the column, the regenerant solution being passed either concurrent or concurrently until the silver chloride has been substantially dissolved and removed from the column and the resin returned to the chloride form.

In the case of the first stripper column being utilized in the sulfate form, for ion analyses wherein barium ion is the effective developing reagent, the stripper bed accumulates barium sulfate as the sulfate ion reacts with the incoming barium ion. Because of the marked insolubility of barium sulfate in all known solutions that are practical to use for regeneration, it is not practical to regenerate such column, and the resin therein is simply replaced and if not already in the sulfate form is placed in such form by passing dilute sulfuric acid or other sulfate solution through the resin bed in the column.

The second stripper column, that is the column containing ion exchange resin in the hydroxide form, is regenerated by simply passing a moderately concentrated hydroxide solution through the column, generally a sodium hydroxide solution having a concentration in the range of about 0.5 to 5 molar.

EXAMPLES

The following examples serve to illustrate the method of the present invention and the invention is not to be considered limited thereto.

EXAMPLE 1

A 2.8 × 300 mm separator column was filled with surface sulfonated styrene-divinylbenzene copolymer containing 2 percent by weight divinylbenzene, having a specific exchange capacity of 0.024 meq/g, and a particle size of 200–400 mesh (U.S. Sieve Series).

The effluent from this column was directed to a first stripper column, 9 × 250 mm, filled with Dowex 1 × 8 type ion exchange resin in the chloride form. The effluent from the first stripper was directed to a second stripper column, 9 × 250 mm, filled with Dowex 1 × 8 type ion exchange resin in the hydroxide form. Injections were made to the separator column using a sample loop injection valve, injecting about 100 microliters of sample per analysis. The eluant used was 0.01 M $AgNO_3$ – 0.002 M $HNO_3$ pumped at a rate of 92 ml/hr through the column train. The effluent from the second stripper column was directed to a conductivity cell and readout means. Samples of known concentration were injected and the elution time noted for the conductivity peaks. The data are listed as follows:

| Sample | Parts Per Million Concentration | Conductivity Peak Maxima In Minutes |
|---|---|---|
| Ethyl Amine | 70 | 6.7 |
| Di Ethyl Amine | 100 | 6.7 |
| Tri Ethyl Amine | 100 | 6.9 |
| Tetra Ethyl Ammonium Bromide | 20 | 7.2 |
| Tetra n-Butyl Ammonium Bromide | 20 | 9.0 |

EXAMPLE 2

A column train, pump, injection valve, injection size, and conductivity cell and readout means used were the same as in Example 1, but in this example the eluant used was 0.002 M $AgNO_3$ –0.0004 M $HNO_3$ at a flow rate of 230 ml/hr. Samples of known concentration were injected and the elution time noted for the conductivity peaks. The data are listed as follows:

| Sample | Parts Per Million Concentration | Conductivity Peak Maxima In Minutes |
|---|---|---|
| Tetra Methyl Ammonium Bromide | 10 | 3.7 |
| Tetra Ethyl Ammonium Bromide | 20 | 4.5 |
| Tri n-Butyl Amine | 200 | 7.5 |

What is claimed is:

1. The method of chromatographic quantitative analysis of a plurality of species of cations in sample solution, which comprises:

adding a predetermined amount of said sample solution to a cation exchange resin bed means, said resin bed means containing a cation exchange resin, and chromatographically separating said plurality of species of cations on eluting said cation species from the said resin bed means with an aqueous solution of a mixture of developing reagents, said mixture being selected from the group consisting of (1) soluble silver salt and highly dissociated acid; the anion of said acid not forming an aqueous-insoluble ion pair with silver ion and neither the anion of said silver salt nor the anion of said acid forming an aqueous-insoluble ion pair with any of the cation species at the concentration thereof in said sample solution, said mixture providing $Ag^+$ and $H^+$ and (2) soluble barium salt and highly dissociated acid, the anion of said acid not forming an aqueous-insoluble ion pair with barium ion and neither the anion of said barium salt nor the anion of said acid forming an aqueous-insoluble ion pair with any of the cation species at the concentration thereof in said sample solution, said mixture providing $Ba^{++}$ and $H^+$, the cation exchange resin and the mixture of developing reagent being preselected to cooperatively facilitate chromatographic separation of said cation species;

passing the effluent from the cation exchange resin bed means through a first anion exchange resin bed means, said first anion exchange resin bed means containing an anion exchange resin in a form capable of precipitating whichever metal ion is provided by the developing reagent, the form being selected from the group consisting of chloride and sulfate, the exchange capacity of the anion exchange resin being at least sufficient to substantially precipitate all of the metal ion contained in the solution of developing reagents, the nature of the first anion exchange resin and the configuration of the bed thereof being preselected to not destroy the said chromatographic separation;

passing the effluent from the first anion exchange resin bed means through a second anion exchange resin bed means containing an anion exchange resin in the hydroxide form, the exchange capacity of the resin in said second bed being at least sufficient to neutralize all of the hydrogen ion in the effluent from the first anion exchange resin bed and derived from the solution of developing reagents used in the chromatographihc separation in the cation exchange resin bed means, the nature of the second anion exchange resin and the configuration of the bed thereof being preselected to not destroy the said chromatographic separation, thereby in said two anion exchange resin bed means effectively converting all of said mixture of developing reagents to weakly ionized form;

and quantitatively detecting each separated cation species exiting from said second anion exchange resin bed means.

2. The method as in claim 1 wherein the mixture of developing reagent is a mixture of $AgNO_3$ and $HNO_3$ and the first anion exchange resin bed means contains an anion exchange resin in the chloride form.

3. The method as in claim 1 wherein the mixture of developing reagents is a mixture of (1) a barium salt selected from Ba $(NO_3)_2$ and $BaCl_2$ and (2) an acid selected from $HNO_3$ and HCl, and the first anion exchange resin bed means contains an anion exchange resin in the sulfate form.

4. The method as in claim 1 wherein the cation exchange resin used in said cation exchange resin bed means is a resin having a specific ion exchange capacity in the range of about 0.005 to 0.1 milliequivalents per gram of resin and the predetermined amount of sample solution being less than that which would overload said resin in said cation exchange resin bed means.

5. The method as in claim 1 in which the cation exchange resin used is surface sulfonated copolymer of styrene and divinylbenzene containing about 2 to 4 percent by weight divinylbenzene and the balance substantially styrene.

6. The method as in claim 1 wherein the ion species exiting from said second anion exchange resin bed means is quantitatively detected by means of a conductivity cell and associated readout means.

7. The method as in claim 1 wherein the anion exchange resins in each of the first and second anion exchange resin bed means exhibit at least 5 times the total exchange capacity of the cation exchange resin used.

8. The method as in claim 1 wherein the anion exchange resins in each of the first and second anion exchange resin bed means exhibit at least 20 times the total exchange capacity of the cation exchange resin used.

9. The method as in claim 1 wherein the cations separated are at least two members of the group selected from cations of water soluble protonated amines, cations of quaternary ammonium compounds, ammonium ion, $Li^+$, $Na^+$, $K^+$, $Rb^+$, $Cs^+$ and $Fr^+$. and $Fr^+$.

10. The method as in claim 1 wherein the cations separated include alkaline earth metal ions.

11. The method as in claim 1 wherein the cations separated are $Na^+$, $Ca^{++}$ and $Mg^{++}$.

12. The method as in claim 1 wherein the cations separated include cations of quaternary ammonium compounds.

13. Apparatus for chromatographic quantitative analysis of a plurality of species of cations selected from water-soluble protonated amines, cations of quaternary ammonium compounds and any mixture thereof in aqueous sample solution, which comprises:
first ion exchange resin bed means for chromatographically separating said species of cations on being added to and eluted from such resin bed with solution of first and second developing reagents; said first developing reagent being selected from a soluble salt providing $Ag^+$ or $Ba^{++}$ and the second developing reagent being selected from compatible highly dissociated acid providing hydrogen ion;
means for adding sample solution of said plurality of species of cations to said first ion exchange resin bed means;
means for adding said solution of first and second developing reagents to said first ion exchange resin bed means;
second ion exchange resin bed means for receiving the effluent of the first resin bed means and precipitating all of the $Ag^+$ or $Ba^{++}$ of the first developing reagent in such effluent and being adapted not to interfere with the chromatographic separation obtained of the said cation species in the first resin bed means;
liquid conduit means for conveying the effluent from the first resin bed means to the secnd resin bed means;
third ion exchange resin bed means for receiving the effluent of the second resin bed means and neutralizing all of the hydrogen ion provided by the second developing reagent and being adapted not to interfere with the chromatographic separation obtained of the said cation species in the first resin bed means;
liquid conduit means for conveying the effluent from the second resin bed means to the third resin bed means;
a conductivity cell with associated read out means for quantitatively detecting each separated cation species of interest exiting from said third resin bed means;
and liquid conduit means for conveying effluent from said third resin bed means to said conductivity cell without traversing any additional resin bed means;
each resin bed means including a hollow substantially cylindrical column not exceeding about 10 millimeters inside diameter and containing the ion exchange resin of that respective means.

14. The apparatus as in claim 13 in which the first resin bed means is charged with a cation exchange resin, the second resin bed means is charged with an anion exchange resin in one of the chloride or sulfate forms, and the third resin bed is charged with an anion exchange resin in the hydroxide form.

15. The apparatus as in claim 14 in which the cation exchange resin is surface sulfonated copolymer of styrene and divinylbenzene containing about 2 to 4 percent by weight divinylbenzene.

16. Apparatus for chromatographic quantitative analysis of a plurality of species of cations selected from water-soluble protonated amines, cations of quaternary ammonium compounds and any mixture thereof in aqueous sample solution, which comprises:
a first chromatographic column adapted to hold a bed of ion exchange resin;
means for adding solution of developing reagent to said first chromatographic column;
means for adding sample solution of said plurality of species of cations to said means for adding solution of developing reagent;
a second chromatographic column adapted to hold a bed of ion exchange resin;
liquid conduit means for conveying effluent from the first chromatographic column to the second chromatographic column;
a third chromatographic column adapted to hold a bed of ion exchange resin;
a conductivity cell with associated read out means for quantitatively detecting cation species of interest exiting from said third column;
and liquid conduit means for conveying effluent from said third chromatographic column to said cconductivity cell;
the number of chromatographic columns in the apparatus not exceeding three and each column not exceeding about 10 millimeters inside diameter.

17. The method as in claim 1 wherein the cations separated include cations of water-soluble protonated amines.

* * * * *

UNITED STATES PATENT AND TRADEMARK OFFICE
CERTIFICATE OF CORRECTION

PATENT NO. : 3,926,559

DATED : December 16, 1975

INVENTOR(S) : Timothy S. Stevens

It is certified that error appears in the above-identified patent and that said Letters Patent are hereby corrected as shown below:

Column 7, line 50, delete "menas" and insert --means--.

Column 8, at the end of line 49, delete "i..," and insert --i.e.,--.

Column 9, line 1, delete "THe" and insert --The--;

Column 9, line 55, change "separtor" to --separator--.

Column 10, lines 5-15, should read as follows:

$$V_B = \frac{V_A C_A K^{M^+}_{E^+} N}{C_B} + X \frac{[H^+]}{[Ag^+]}$$

where $$X = \frac{V_A C_A K^{M^+}_{E^+} N}{C_B}$$

$$V_C = X \frac{[H^+]}{[Ag^+]}$$

UNITED STATES PATENT AND TRADEMARK OFFICE
CERTIFICATE OF CORRECTION

PATENT NO. : 3,926,559
DATED : December 16, 1975
INVENTOR(S) : Timothy S. Stevens It is certified that error appears in the above-identified patent and that said Letters Patent are hereby corrected as shown below:

Column 10, lines 26-31 should read as follows:

$K^{M^+}_{E^+}$ = selectivity coefficient, relative to eluant ion $E^+$ of the sample cation $M^+$, which in the series to be analyzed has the greatest affinity for the separating resin. In this case $K^{M^+}_{Ag^+}$ $K^{M^+}_{H^+}$ and in effect only $Ag^+$ is considered an eluant in this regard. The same is true using $Ba^+/H^+$ mixed eluant.

Column 10, line 44, after the word "order", delete "than" and insert --that--.

Column 12, line 65, delete "availabe" and insert --available--.

Column 13, line 12, delete "AS" and insert --As--;

Column 13, line 42, delete "aabout" and insert --about--;

Column 13, line 59, change "means" to --mean--.

Column 17, at the end of line 10, delete "and" and on line 11, delete "$Fr^+$.";

Column 17, line 47, delete "secnd" and insert --second--.

UNITED STATES PATENT AND TRADEMARK OFFICE
CERTIFICATE OF CORRECTION

PATENT NO. : 3,926,559

DATED : December 16, 1975

INVENTOR(S) : Timothy S. Stevens

It is certified that error appears in the above-identified patent and that said Letters Patent are hereby corrected as shown below:

Column 18, line 48, delete "ccon-" and insert --con- --.

Signed and Sealed this sixth Day of April 1976

[SEAL]

Attest:

RUTH C. MASON
Attesting Officer

C. MARSHALL DANN
Commissioner of Patents and Trademarks